(12) United States Patent
Chen et al.

(10) Patent No.: US 12,502,687 B2
(45) Date of Patent: Dec. 23, 2025

(54) DISPENSING ADJUSTMENT SYSTEM AND METHOD THEREOF

(71) Applicant: KULICKE AND SOFFA HI-TECH CO., LTD., New Taipei (TW)

(72) Inventors: Lu-Min Chen, Taipei (TW); Tsung-Lin Tsai, Taipei (TW)

(73) Assignee: Kulicke & Soffa Hi-Tech Co., Ltd., New Taipei (TW)

( * ) Notice: Subject to any disclaimer, the term of this patent is extended or adjusted under 35 U.S.C. 154(b) by 407 days.

(21) Appl. No.: 17/865,122

(22) Filed: Jul. 14, 2022

(65) Prior Publication Data

US 2023/0405629 A1  Dec. 21, 2023

(30) Foreign Application Priority Data

Jun. 20, 2022  (TW) .................................. 111122776

(51) Int. Cl.
*B05C 5/02* (2006.01)

(52) U.S. Cl.
CPC .......... *B05C 5/0225* (2013.01); *B05C 5/0208* (2013.01)

(58) Field of Classification Search
CPC ..... B05C 5/0225; B05C 5/0208; H01L 22/12; H01L 22/20; A47K 5/1217
See application file for complete search history.

(56) References Cited

U.S. PATENT DOCUMENTS

| | | | | |
|---|---|---|---|---|
| 9,810,641 | B2* | 11/2017 | Sood ................... | G01N 21/8806 |
| 2005/0001869 | A1* | 1/2005 | Abernathy ........... | G05D 7/0629 |
| | | | | 347/17 |
| 2007/0238185 | A1* | 10/2007 | Kuimelis ........... | G01N 21/6452 |
| | | | | 436/172 |
| 2012/0040477 | A1* | 2/2012 | Yu .......................... | H01L 22/20 |
| | | | | 156/356 |
| 2015/0037385 | A1* | 2/2015 | Shah ....................... | A61L 27/56 |
| | | | | 435/395 |
| 2018/0237643 | A1* | 8/2018 | Nowak ............... | C08G 18/3812 |
| 2020/0179569 | A1* | 6/2020 | Giessl ................ | C08B 37/0072 |
| 2023/0420406 | A1* | 12/2023 | Chen ....................... | H01L 24/83 |
| 2024/0286166 | A1* | 8/2024 | Merchant ............. | G05D 7/0676 |

* cited by examiner

*Primary Examiner* — Jeremy Carroll
(74) *Attorney, Agent, or Firm* — Christopher M. Spletzer, Sr.

(57) ABSTRACT

A dispensing adjustment system is provided. The dispensing adjustment system includes an optical measuring unit, a glue dispensing control unit, and a calculating unit electrically connected to the optical measuring unit and the glue dispensing control unit. The optical measuring unit measures a glue to obtain a three-dimensional (3D) glue signal. The calculating unit receives the 3D glue signal to obtain a volume or a weight of the glue and compares the volume or weight of the glue with a default glue value. If the volume or the weight of the glue fails to conform to the default glue value, the calculating unit transmits a glue adjustment signal to the glue dispensing control unit, which in turn adjusts the amount of glue supplied according to the glue dispensing adjustment signal.

19 Claims, 6 Drawing Sheets

DISPENSING ADJUSTMENT SYSTEM AND METHOD THEREOF

BACKGROUND OF THE INVENTION

1. Field of the Invention

The present invention relates to a dispensing adjustment system, in particular to a dispensing adjustment system capable of adjust the current glue dispensing amount according to the previous glue dispensing amount via a closed loop system. The present invention further relates to the dispensing adjustment method of the system.

2. Description of the Prior Art

Chip bonding technology or substrate bonding technology is a very important technology or process in the semiconductor industry, the electronic industry or the touch display industry. The currently available bonding technology is to selectively use a visual unit to visually locate the target position, to be bonded, of the substrate, or set the target position of the substrate via a program in advance so as to dispense the glue to the target position. Then, the lamination process is executed to bond two substrates with each other or bond the die(s) to the substrate.

However, the aforementioned bonding technology still has the problem that the glue may be insufficient or overflows because the amount of the glue dispensed to the target position may not be correctly determined due to many factors, such as glue density, glue viscosity, environmental humidity, environmental temperature, etc. The user cannot immediately know the situation that the glue is insufficient or overflows during the bonding process. The above situations can only be found via the following quality control process. Accordingly, the products processed by the currently available bonding technology cannot achieve the desired quality, which increase the cost thereof.

Therefore, it has become an important issue in the industry to provide the real-time feedback information about adjusting the glue dispensing amount during the bonding process.

SUMMARY OF THE INVENTION

In view of the above-mentioned shortcomings of the prior art, the inventor of the present invention has tried hard to innovate in order to improve prior art. After conducting research and development for many years, the inventor of the present invention has successfully developed a dispensing adjustment system and the method thereof.

One embodiment of the present invention provides a dispensing adjustment system, which includes an optical measuring unit, a glue dispensing control unit and a calculating unit. The calculating unit is electrically connected to the optical measuring unit and the glue dispensing control unit. The optical measuring unit measures a glue to obtain a $N^{th}$ three-dimensional (3D) glue signal or a $N^{th}$ two-dimensional (2D) glue signal and N is a constant. The calculating unit receives the $N^{th}$ 3D glue signal or the $N^{th}$ 2D glue signal to obtain the volume or the weight of the glue and compares the volume or the weight of the glue with a default glue value. If the volume or the weight of the glue fails to conform to the default glue value, the calculating unit transmits a $N^{th}$ glue dispensing adjustment signal to the glue dispensing control unit, such that the glue dispensing control unit adjusts the glue supplied thereby according to the $N^{th}$ glue dispensing adjustment signal.

In one embodiment, the glue dispensing control unit provides the glue for a glue dispensing unit for the glue dispensing unit to dispense the glue to the target position, to be bonded, of a $N+1^{th}$ substrate.

In one embodiment, the optical measuring unit is a laser ranger, a laser triangulation measuring device, a device for optical interference measurement, a confocal laser scanning microscopy, the combination of a femtosecond infrared laser and a confocal microscopy, or a confocal laser.

In one embodiment, the optical measuring unit includes at least one upper visual module and at least one lateral visual module, and the upper visual module and the lateral visual module are charge-coupled device (CCD) cameras or CCD image sensors.

In one embodiment, the volume or the weight of the glue supplied by the glue dispensing control unit is 99%~101% of the default glue value.

Another embodiment of the present invention provides a dispensing adjustment method, which includes the following steps:

Obtaining a $N^{th}$ 3D glue signal: conveying a $N^{th}$ substrate to a position under a glue dispensing unit by a conveying unit, and N is a constant; dispensing a glue to the target position of the $N^{th}$ substrate by the glue dispensing unit; measuring the glue to obtain a $N^{th}$ 3D glue signal or the $N^{th}$ 2D glue signal by an optical measuring unit;

Obtaining a $N^{th}$ glue dispensing adjustment signal: performing a calculation according to the $N^{th}$ 3D glue signal or the $N^{th}$ 2D glue signal by a calculating unit to obtain the volume or the weight of the glue at the target position of the $N^{th}$ substrate and comparing the volume or the weight of the glue with a default glue value by the calculating unit, wherein if the volume or the weight of the glue fails to conform to the default glue value, the calculating unit transmits a $N^{th}$ glue dispensing adjustment signal to a glue dispensing control unit; and Dispensing the glue to a $N+1^{th}$ substrate: conveying the $N^{th}$ substrate to leave from the position under the glue dispensing unit and conveying a $N+1^{th}$ substrate to the position under the glue dispensing unit, adjusting the glue supplied by the glue dispensing control unit according to the $N^{th}$ glue dispensing adjustment signal and provided the glue for the glue dispensing unit, and dispensing the glue supplied by the glue dispensing control unit to the target position of the $N+1^{th}$ substrate by the glue dispensing unit and then returning to the step of obtaining the $N^{th}$ 3D glue signal.

In one embodiment, if the optical measuring unit is a confocal laser scanning microscopy or the combination of a femtosecond infrared laser and a confocal microscopy, the optical measuring unit measures the glue at the target position of the $N^{th}$ substrate to obtain the $N^{th}$ 3D glue signal.

In one embodiment, if the optical measuring unit includes at least one upper visual module and at least one lateral visual module, the upper visual module captures the upper image of the glue at the target position of the $N^{th}$ substrate and the lateral visual module captures the lateral image of the glue at the target position of the $N^{th}$ substrate. The upper image and the lateral image are provided for the calculating unit, such that the calculating unit can obtain the $N^{th}$ 3D glue signal or the $N^{th}$ 2D glue signal according to the upper image and the lateral image.

As described above, the dispensing adjustment system and the method thereof can integrate the optical measuring unit with the glue dispensing control unit and the calculating unit to form a closed loop. Thus, after the glue is dispensed, the calculating unit can obtain the volume or the weight of the glue according to the 3D information (3D glue signal) measured by the optical measuring unit. The calculating unit can compare the volume or the weight of the glue with a default glue value. If the volume or the weight of the glue with a default glue value fails to meet the default glue value, the calculating unit transmits a glue dispensing adjustment signal to the glue dispensing control unit, such that the glue dispensing control unit adjusts the glue supplied to the glue dispensing unit. The dispensing adjustment system and the method thereof according to the present invention can adjust the current glue dispensing amount according to the feedback information of the previous glue dispensing amount via the closed loop, which can solve the problem that the glue is insufficient or overflows in order to improve the bonding quality.

BRIEF DESCRIPTION OF THE DRAWINGS

For a better understanding of the aforementioned embodiments of the invention as well as additional embodiments thereof, reference should be made to the Description of Embodiments below, in conjunction with the following drawings in which like reference numerals refer to corresponding parts throughout the figures.

DETAILED DESCRIPTION OF THE PREFERRED EMBODIMENT

The following description is about embodiments of the present invention; however it is not intended to limit the scope of the present invention.

Figure 1:
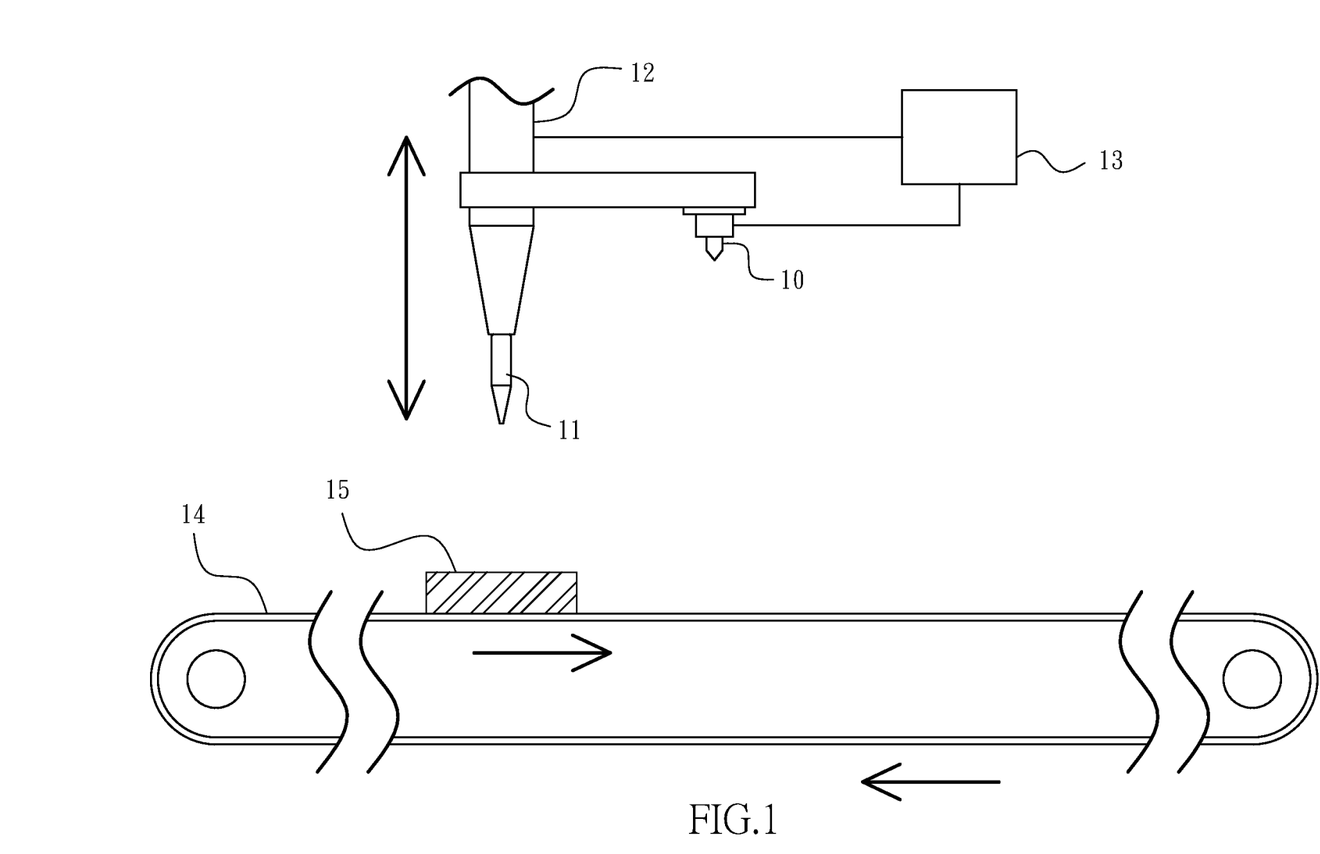
FIG. 1 is a schematic view of an operation of a dispensing adjustment system in accordance with a first embodiment of the present invention.

Please refer to FIG. 1, which is a schematic view of an operation of a dispensing adjustment system in accordance with a first embodiment of the present invention. As shown in FIG. 1, the dispensing adjustment system includes an optical measuring unit 10, a glue dispensing unit 11, a glue dispensing control unit 12, a calculating unit 13 and a conveying unit 14.

The optical measuring unit 10 is disposed over the conveying unit 14. The optical measuring unit 10 may be a laser ranger, a laser triangulation measuring device, a device for optical interference measurement, a confocal laser scanning microscopy, the combination of a femtosecond infrared laser and a confocal microscopy, or a confocal laser.

The glue dispensing unit 11 is disposed over the conveying unit 14 and adjacent to the optical measuring unit 10. The glue dispensing unit 11 may be a dispensing needle.

The glue dispensing control unit 12 is connected to the glue dispensing unit 11 and the glue dispensing control unit 12 can control the volume or the weight of the glue supplied thereby to the glue dispensing unit 11.

The calculating unit 13 is electrically connected to the glue dispensing control unit 12 and the optical measuring unit 10.

The conveying unit 14 conveys a target substrate (hereinafter "the first substrate 15") to the position under the glue dispensing unit 11 and the glue dispensing unit 11 dispenses the glue to the target position of the first substrate 15. The optical measuring unit 10 measures the glue at the target position of the first substrate 15 with a view to obtain a three-dimensional (3D) glue signal (hereinafter "the first 3D signal") or a two-dimensional (2D) glue signal (hereinafter "the first 2D signal").

In this embodiment, the optical measuring unit 10 is a confocal laser scanning microscopy or the combination of a femtosecond infrared laser and a confocal microscopy. The operational principle of the confocal laser scanning microscopy (CLSM) is to exclude the lights within the out-of-focal plane via a pinhole. The technology of the confocal laser scanning microscopy can remove the lights within the out-of-focal plane of the image of a conventional fluorescence microscope. Accordingly, this technology can observe each of the layers of a sample, which can significantly improve not only the contrast and the resolution of the image, but also can increase the signal-to-noise ratio of fluorescence detection.

The first 3D glue signal or the first 2D glue signal is transmitted to the calculating unit 13. Then, the calculating unit 13 performs calculation according to the first 3D glue signal or the first 2D glue signal to obtain the volume or the weight of the glue at the target position of the first substrate 15. The calculating unit 13 compares the volume or the weight of the glue obtained by the calculation with a default glue value. If the volume or the weight of the glue is greater or less than the default glue value, the calculating unit 13 transmits a glue dispensing adjustment signal (hereinafter "the first glue dispensing adjustment signal") to the glue dispensing control unit 12. The glue dispensing control unit 12 adjusts the glue supplied thereby to the glue dispensing unit 11 according to the first glue dispensing adjustment signal. In this way, the volume or the weight of the glue at the target position of the substrate can conform to or be close to the default glue value. Via the above mechanism, the glue supplied by the glue dispensing control unit 12 may be close to 99%~101% of the default glue value. In this case, the volume or the weight of the glue supplied by the glue dispensing control unit 12 can be 99%~101% of the default glue value. The default glue value can set a tolerance.

Figure 2:
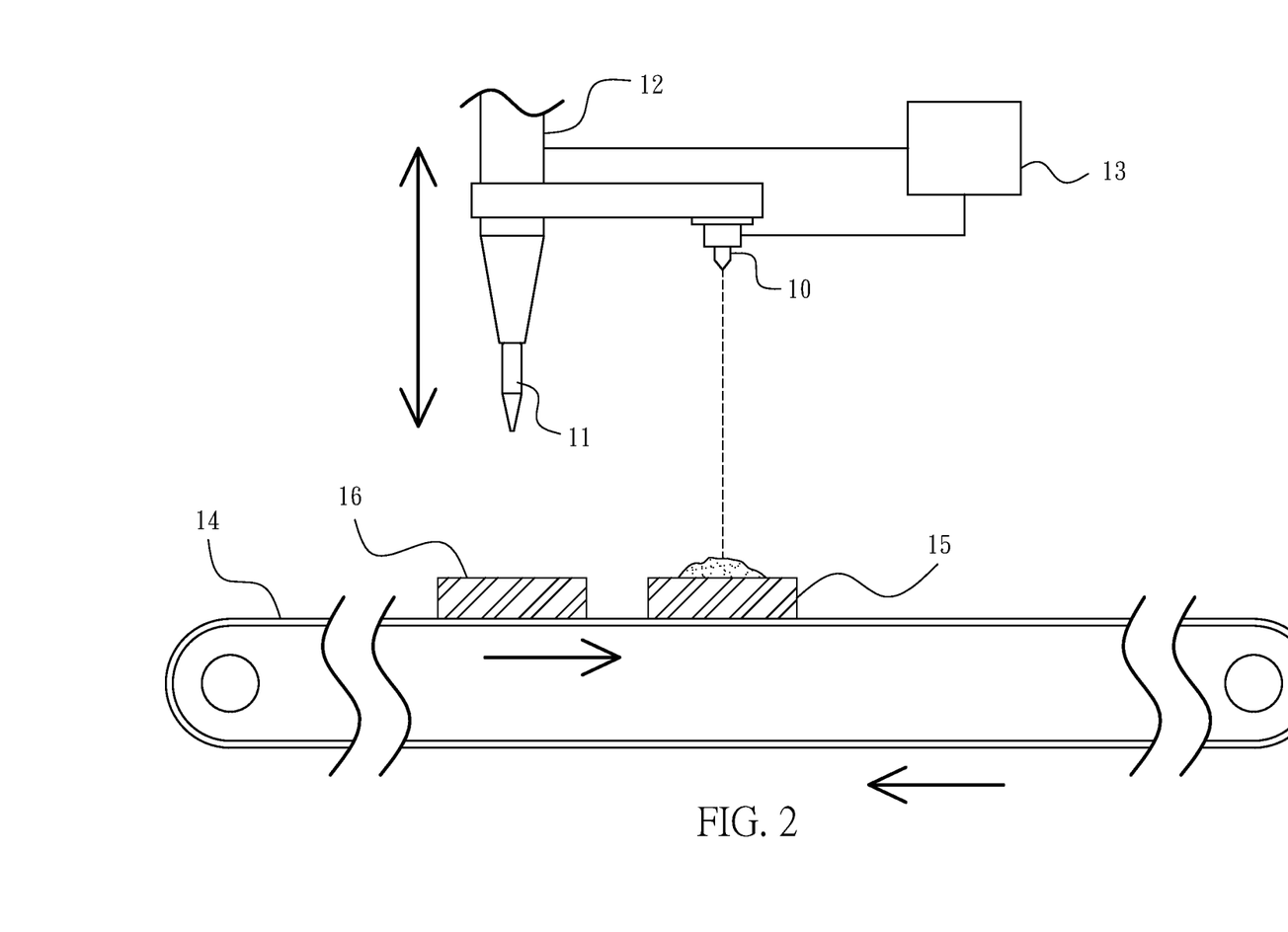
FIG. 2 is a schematic view of another operation of the dispensing adjustment system in accordance with the first embodiment of the present invention.

Please refer to FIG. 2, which is a schematic view of another operation of the dispensing adjustment system in accordance with the first embodiment of the present invention. As shown in FIG. 2, the conveying unit 14 conveys the first substrate 15 to leave from the position under the glue dispensing unit 11 and conveys another target substrate (hereinafter "the second substrate 16") to the position under the glue dispensing unit 11. The glue dispensing unit 11 dispenses the glue, supplied by the glue dispensing control unit 12, at the target position of the second substrate 16.

Figure 3:
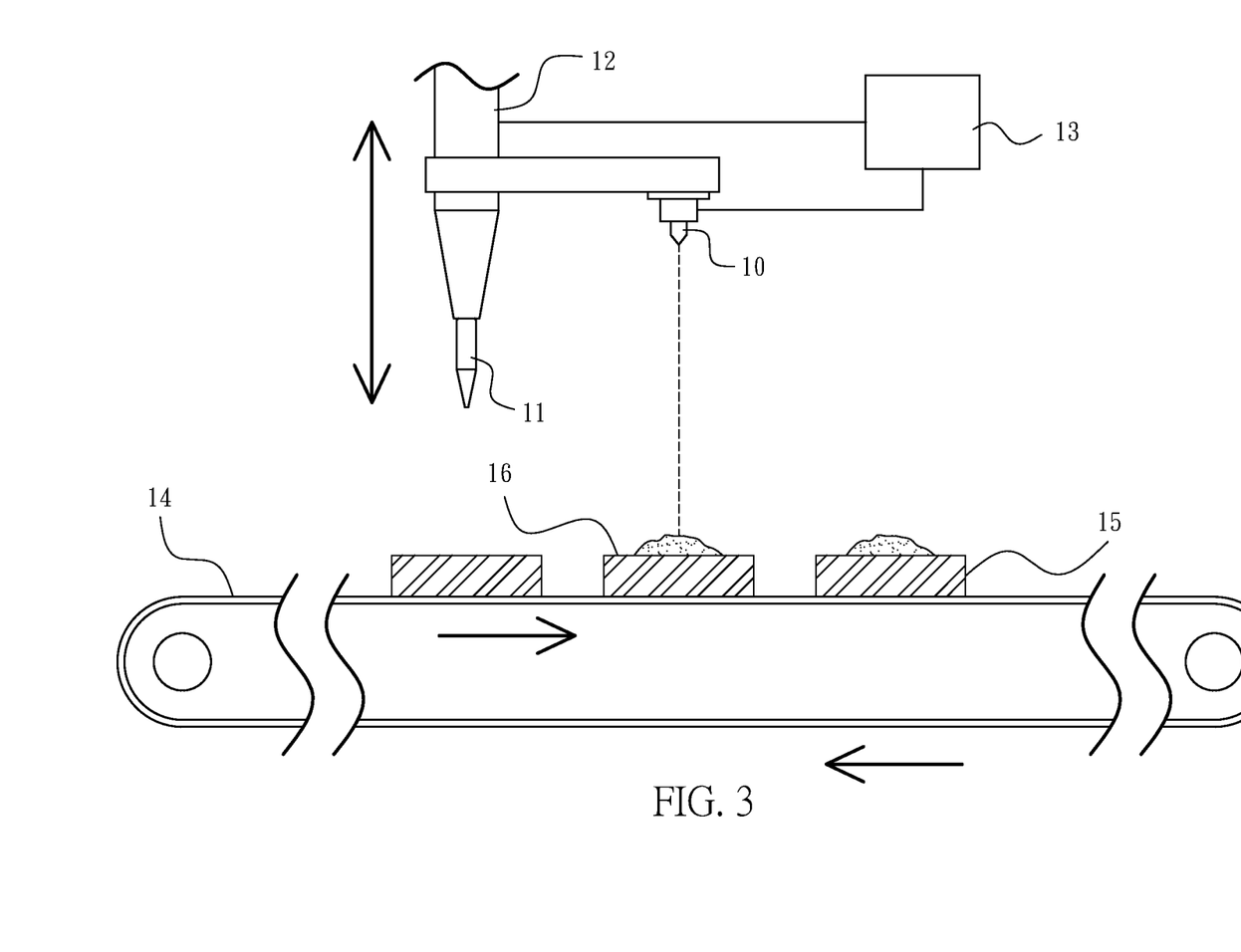
FIG. 3 is a schematic view of still another operation of the dispensing adjustment system in accordance with the first embodiment of the present invention.

Please refer to FIG. 3, which is a schematic view of still another operation of the dispensing adjustment system in accordance with the first embodiment of the present invention. As shown in FIG. 3, the optical measuring unit 10 measures the glue at the target position of the second substrate 16 to obtain a 3D glue signal (hereinafter "the second 3D glue signal") or 2D glue signal (hereinafter "the second 2D glue signal"). The second 3D glue signal or the second 2D glue signal is transmitted to the calculating unit 13. Next, the calculating unit 13 performs calculation according to the second 3D glue signal or the second 2D glue signal so as to obtain the volume or the weight of the glue at the target position of the second substrate 16. The calculating unit 13 compares the volume or the weight of the glue obtained by the calculation with a default glue value. If the volume or the weight of the glue is greater or less than the default glue value, the calculating unit 13 transmits a glue dispensing adjustment signal (hereinafter "the second glue dispensing adjustment signal") to the glue dispensing control unit 12. The glue dispensing control unit 12 adjusts the glue supplied thereby to the glue dispensing unit 11 according to the first glue dispensing adjustment signal. In this way, the volume or the weight of the glue at the target position of the substrate can conform to or be close to the default glue value.

Figure 4:
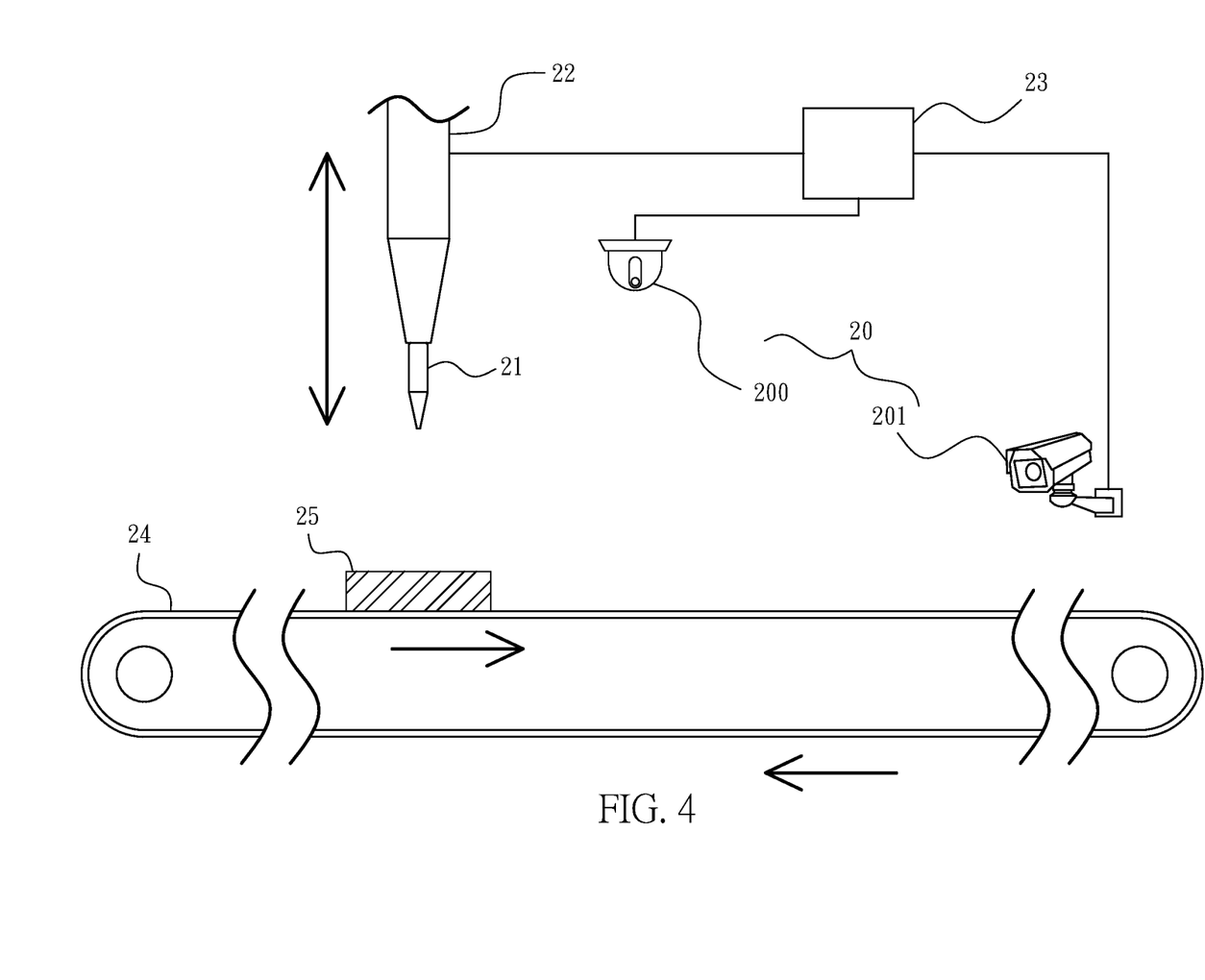
FIG. 4 is a schematic view of an operation of a dispensing adjustment system in accordance with a second embodiment of the present invention.

Please refer to FIG. 4, which is a schematic view of an operation of a dispensing adjustment system in accordance with a second embodiment of the present invention. As shown in FIG. 4, the dispensing adjustment system includes an optical measuring unit 20, a glue dispensing unit 21, a glue dispensing control unit 22, a calculating unit 23 and a conveying unit 24.

The optical measuring unit 20 includes at least one upper visual module 200 and at least one lateral visual module 201. The upper visual module 200 is disposed over the conveying unit 24 and the lateral visual module 201 is disposed at one side of the conveying unit 24. In this embodiment, the upper visual module 200 and the lateral visual module 201 are charge-coupled device (CCD) cameras or CCD image sensors.

The glue dispensing unit 21 is disposed over the conveying unit 24. The glue dispensing unit 11 may be a dispensing needle.

The glue dispensing control unit 22 is connected to the glue dispensing unit 21 and the glue dispensing control unit 22 can control the volume or the weight of the glue supplied thereby to the glue dispensing unit 21.

The calculating unit 23 is electrically connected to the glue dispensing control unit 22 and the optical measuring unit 20.

The conveying unit 24 conveys a target substrate (hereinafter "the third substrate 25") to the position under the glue dispensing unit 11 and the glue dispensing unit 21 dispenses the glue to the target position of the third substrate 25. The optical measuring unit 20 captures the images of the glue at the target position of the third substrate 25. The upper visual module 200 captures the upper image of the glue at the target position of the third substrate 25 and the lateral visual module 201 captures the lateral image of the glue at the target position of the third substrate 25. The upper image and the lateral image are provided for the calculating unit 23, such that the calculating unit 23 obtains a 3D glue signal (hereinafter "the third 3D glue signal") or a 2D glue signal (hereinafter "the third 2D glue signal") according to the upper image and the lateral image.

The calculating unit 23 performs calculation according to the third 3D glue signal or the third 2D glue signal to obtain the volume or the weight of the glue at the target position of the third substrate 25. The calculating unit 23 compares the volume or the weight of the glue obtained by the above calculation with a default glue value. If the volume or the weight of the glue fails to conform to the default glue value, the calculating unit 23 transmits a glue dispensing adjustment signal (hereinafter "the third glue dispensing adjustment signal") to the glue dispensing control unit 22

Figure 5:
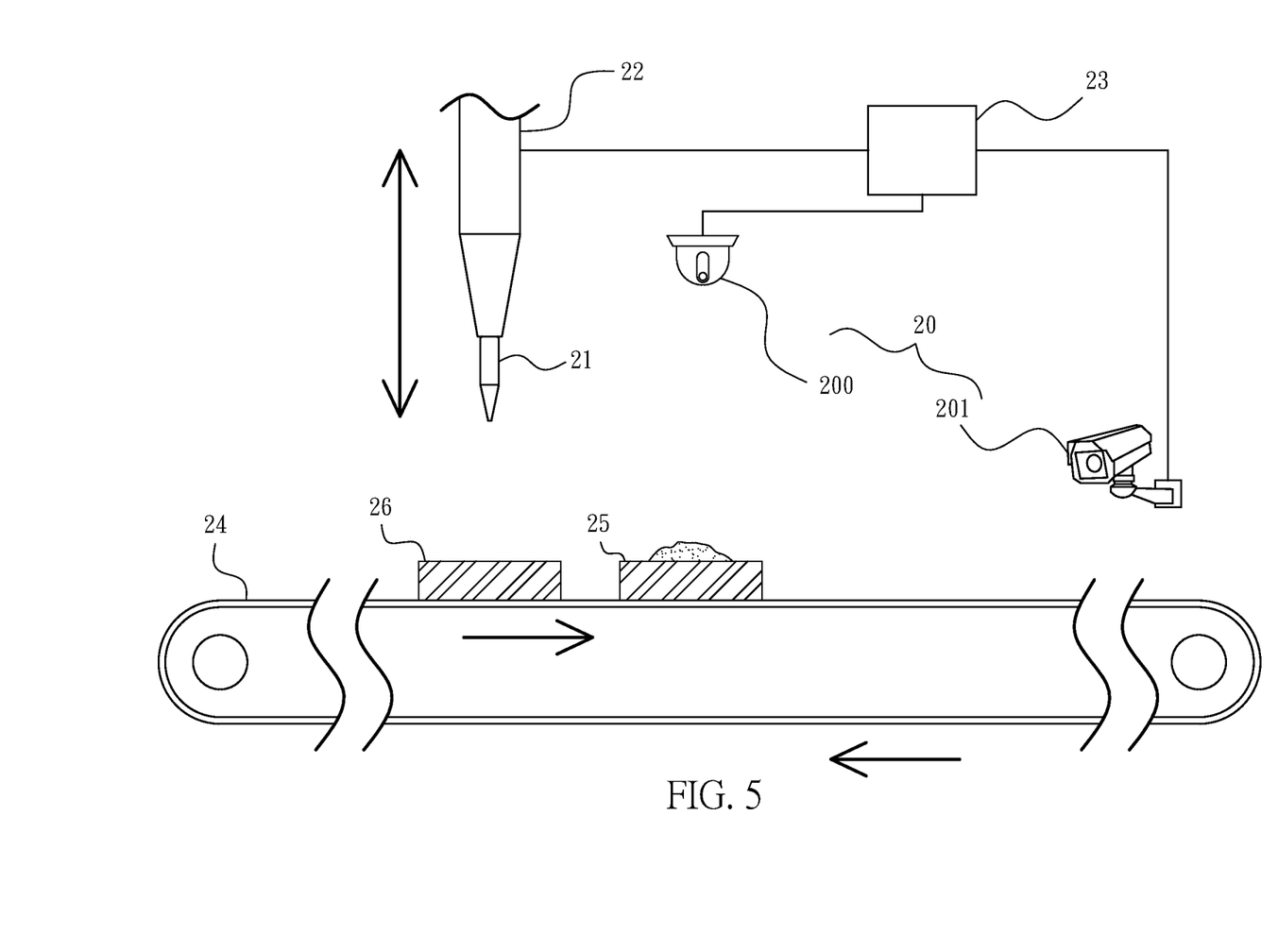
FIG. 5 is a schematic view of another operation of the dispensing adjustment system in accordance with the second embodiment of the present invention.

Please refer to FIG. 5, which is a schematic view of another operation of the dispensing adjustment system in accordance with the second embodiment of the present invention. As shown in FIG. 5, the conveying unit 24 conveys the third substrate 25 to leave from the position under the glue dispensing unit 21 and conveys another substrate (hereinafter "the fourth substrate") to the position under the glue dispensing unit 21. The glue dispensing control unit 22 adjusts the glue supplied thereby to the glue dispensing unit 21 according to the third glue dispensing adjustment signal. Then, the glue dispensing unit 21 dispenses the glue supplied by the glue dispensing control unit 22 to the target position of the fourth substrate 26.

Figure 6:
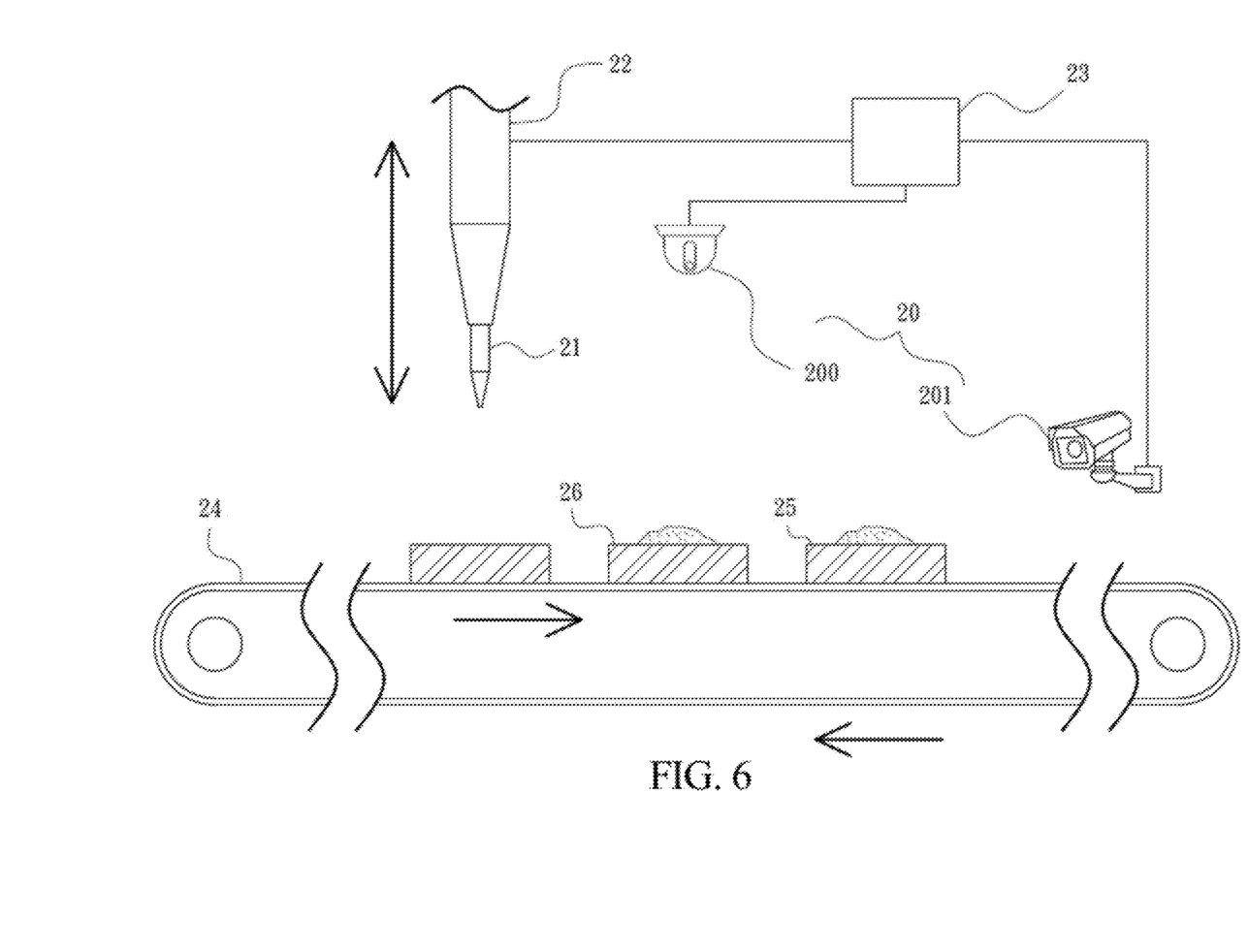
FIG. 6 is a schematic view of still another operation of the dispensing adjustment system in accordance with the second embodiment of the present invention.

Please refer to FIG. 6, which is a schematic view of still another operation of the dispensing adjustment system in accordance with the second embodiment of the present invention. As shown in FIG. 6, the optical measuring unit 20 captures the images of the glue at the target position of the fourth substrate 26. The upper visual module 200 captures the upper image of the glue at the target position of the fourth substrate 26 and the lateral visual module 201 captures the lateral image of the glue at the target position of the fourth substrate 26. The upper image and the lateral image are provided for the calculating unit 23, such that the calculating unit 23 obtains a 3D glue signal (hereinafter "the fourth 3D glue signal") or a 2D glue signal (hereinafter "the fourth 2D glue signal") according to the upper image and the lateral image.

The calculating unit 23 performs calculation according to the fourth 3D glue signal or the fourth 2D glue signal to obtain the volume or the weight of the glue at the target position of the fourth substrate 26. The calculating unit 23 compares the volume or the weight of the glue obtained by the above calculation with a default glue value. If the volume or the weight of the glue fails to conform to the default glue value, the calculating unit 23 transmits a glue dispensing adjustment signal (hereinafter "the fourth glue dispensing adjustment signal") to the glue dispensing control unit 22

Afterward, the glue dispensing control unit 22 adjusts the glue supplied thereby to the glue dispensing unit 21 according to the fourth glue dispensing adjustment signal in order to make sure that the volume or the weight of the glue at the target position of the substrate can conform to or be close to the default glue value.

The dispensing adjustment method according to the present invention includes the following steps:

Step A: obtaining a $N^{th}$ 3D glue signal or a $N^{th}$ 2D glue signal: please refer to FIG. 1~FIG. 3 again, a conveying unit 14 conveys a $N^{th}$ substrate to the position under a glue dispensing unit 11, and N is a constant. The glue dispensing unit 11 dispenses the glue to the target position of the $N^{th}$ substrate. If the optical measuring unit 10 is a confocal laser scanning microscopy or the combination of a femtosecond infrared laser and a confocal microscopy. The optical measuring unit 10 measures the glue to obtain a $N^{th}$ 3D glue signal or a $N^{th}$ 2D glue signal.

Please refer to FIG. 3~FIG. 6. If the optical measuring unit 20 includes an upper visual module 200 and a lateral visual module 201. The upper visual module 200 captures the upper image of the glue at the target position of the $N^{th}$ substrate. The lateral visual module 201 captures the lateral image of the glue at the target position of the $N^{th}$ substrate. The upper image and the lateral image are provided for a calculating unit 23, such that the calculating unit 23 can obtain a $N^{th}$ 3D glue signal or a $N^{th}$ 2D glue signal according to the upper image and the lateral image.

Step B: obtaining a $N^{th}$ glue dispensing adjustment signal; please refer to FIG. 1~FIG. 3 again, the calculating unit 13 performs calculation according to the $N^{th}$ 3D glue signal or the $N^{th}$ 2D glue signal to obtain the volume or the weight of the glue at the target position of the $N^{th}$ substrate. The calculating unit 13 compares the volume or the weight of the glue obtained by the calculation with a default glue value. If the volume or the weight of the glue fails to conform to the default glue value, the calculating unit 13 transmits a $N^{th}$ glue dispensing adjustment signal to the glue dispensing control unit 12.

Step C: dispensing the glue to a $N+1^{th}$ substrate: a conveying unit 14 conveys the $N^{th}$ substrate to leave from the position under the glue dispensing unit 11 and conveys a $N+1^{th}$ substrate to the position under the glue dispensing unit 11. The glue dispensing control unit 12 adjusts the glue supplied thereby according to the $N^{th}$ glue dispensing adjustment signal and provides the glue to the glue dispensing unit 11. The glue dispensing unit 11 dispenses the glue supplied by the glue dispensing control unit 12 to the target position of the $N+1^{th}$ substrate. Then, the process returns to Step A.

To sum up, the dispensing adjustment system and the method thereof according to the present invention can integrate the optical measuring unit with the glue dispensing control unit and the calculating unit to form a closed loop. Thus, after the glue is dispensed, the calculating unit can obtain the volume or the weight of the glue according to the 3D information (3D glue signal) measured by the optical measuring unit. The calculating unit can compare the volume or the weight of the glue with a default glue value. If the volume or the weight of the glue with a default glue value fails to meet the default glue value, the calculating unit transmits a glue dispensing adjustment signal to the glue dispensing control unit, such that the glue dispensing control unit adjusts the glue supplied to the glue dispensing unit. The dispensing adjustment system and the method thereof according to the present invention can adjust the current glue dispensing amount according to the feedback information of the previous glue dispensing amount via the closed loop, which can solve the problems that the glue is insufficient or overflows in order to improve the bonding quality.

The above disclosure is related to the detailed technical contents and inventive features thereof. Those skilled in the art may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A dispensing adjustment system, comprising:
   an optical measuring unit;
   a glue dispensing control unit; and
   a calculating unit electrically connected to the optical measuring unit and the glue dispensing control unit;
   wherein the optical measuring unit measures a glue to obtain a $N^{th}$ three-dimensional (3D) glue signal and N is a constant, and the calculating unit receives the $N^{th}$ 3D glue signal to obtain a weight of the glue and compares the weight of the glue with a default glue value, wherein if the weight of the glue fails to conform to the default glue value, the calculating unit transmits a $N^{th}$ glue dispensing adjustment signal to the glue dispensing control unit, whereby the glue dispensing control unit adjusts the glue supplied thereby according to the $N^{th}$ glue dispensing adjustment signal.

2. The dispensing adjustment system of claim 1 wherein the optical measuring unit includes a confocal laser scanning microscopy measuring unit.

3. The dispensing adjustment system of claim 2, wherein the optical measuring unit excludes lights within an out-of-focal plane via a pinhole.

4. The dispensing adjustment system of claim 2, wherein the optical measuring unit observes a plurality of layers of the glue to obtain the $N^{th}$ 3D glue signal.

5. The dispensing adjustment system of claim 2, wherein the optical measuring unit is a confocal laser scanning microscopy, a combination of a femtosecond infrared laser and a confocal microscopy, or a confocal laser.

6. The dispensing adjustment system of claim 1, wherein the glue dispensing control unit provides the glue for a glue dispensing unit to dispense the glue to a target position of a $N+1^{th}$ substrate.

7. The dispensing adjustment system of claim 1, wherein the weight of the glue supplied by the glue dispensing control unit is 99%-101% of the default glue value.

8. The dispensing adjustment system of claim 1, further comprising a conveying unit, the optical measuring unit being disposed over the conveying unit, the conveying unit configured to convey an $N^{th}$ target substrate to a position within a view of the optical measuring unit to obtain the three-dimensional (3D) glue signal.

9. The dispensing adjustment system of claim 1, wherein the glue dispensing control unit is connected to a glue dispensing unit, and the glue dispensing control unit can control the weight of the glue supplied thereby to the glue dispensing unit.

10. The dispensing adjustment system of claim 1, further comprising a glue dispensing unit, the glue dispensing unit being a dispensing needle.

11. A dispensing adjustment method, comprising:
   obtaining a $N^{th}$ 3D glue signal: conveying a $N^{th}$ substrate to a position under a glue dispensing unit by a conveying unit, wherein N is a constant; dispensing a glue to a target position of the $N^{th}$ substrate by the glue dispensing unit; measuring the glue to obtain a $N^{th}$ 3D glue signal by an optical measuring unit;
   obtaining a $N^{th}$ glue dispensing adjustment signal: performing a calculation according to the $N^{th}$ 3D glue signal by a calculating unit to obtain a weight of the glue at the target position of the $N^{th}$ substrate and comparing the weight of the glue with a default glue value by the calculating unit, wherein if the weight of the glue fails to conform to the default glue value, the calculating unit transmits a $N^{th}$ glue dispensing adjustment signal to a glue dispensing control unit; and
   dispensing the glue to a $N+1^{th}$ substrate: conveying the $N^{th}$ substrate to leave from the position under the glue dispensing unit and conveying a $N+1^{th}$ substrate to the position under the glue dispensing unit, adjusting the glue supplied by the glue dispensing control unit according to the $N^{th}$ glue dispensing adjustment signal and provided the glue for the glue dispensing unit, and dispensing the glue supplied by the glue dispensing control unit to a target position of the $N+1^{th}$ substrate by the glue dispensing unit and then returning to a step of obtaining the $N^{th}$ 3D glue signal.

12. The dispensing adjustment method of claim 11, wherein the step of obtaining the $N^{th}$ 3D glue signal includes measuring the glue to obtain the $N^{th}$ 3D glue signal by the optical measuring unit, the optical measuring unit including a confocal laser scanning microscopy measuring unit.

13. The dispensing adjustment method of claim 12, wherein the optical measuring unit is a confocal laser scanning microscopy, a combination of a femtosecond infrared laser and a confocal microscopy, or a confocal laser, and the optical measuring unit measures the glue at the target position of the $N^{th}$ substrate to obtain the $N^{th}$ 3D glue signal.

14. The dispensing adjustment method of claim 12, wherein the step of obtaining the $N^{th}$ 3D glue signal includes using a pinhole of the optical measuring unit to exclude lights within an out-of-focal plane.

15. The dispensing adjustment method of claim 12, wherein the step of obtaining the $N^{th}$ 3D glue signal includes measuring the glue by observing a plurality of layers of the glue to obtain the $N^{th}$ 3D glue signal by the optical measuring unit.

16. The dispensing adjustment method of claim 11, wherein the weight of the glue supplied by the glue dispensing control unit is 99%-101% of the default glue value.

17. The dispensing adjustment method of claim 11, wherein the glue dispensing unit is a dispensing needle.

18. A dispensing adjustment system, comprising:
an optical measuring unit, the optical measuring unit being a confocal laser scanning microscopy optical measuring unit, the confocal laser scanning microscopy optical measuring unit being configured to observe layers of a glue, the optical measuring unit configured to exclude lights within an out-of-focal plane via a pinhole;
a glue dispensing control unit; and
a calculating unit electrically connected to the optical measuring unit and the glue dispensing control unit;
wherein the optical measuring unit measures a glue to obtain a $N^{th}$ three-dimensional (3D) glue signal and N is a constant, and the calculating unit receives the $N^{th}$ 3D glue signal to obtain a volume or a weight of the glue and compares the volume or the weight of the glue with a default glue value, wherein if the volume or the weight of the glue fails to conform to the default glue value, the calculating unit transmits a $N^{th}$ glue dispensing adjustment signal to the glue dispensing control unit, whereby the glue dispensing control unit adjusts the glue supplied thereby according to the $N^{th}$ glue dispensing adjustment signal.

19. A dispensing adjustment method, comprising:
obtaining a $N^{th}$ 3D glue signal: conveying a $N^{th}$ substrate to a position under a glue dispensing unit by a conveying unit, wherein N is a constant; dispensing a glue to a target position of the $N^{th}$ substrate by the glue dispensing unit; measuring the glue to obtain a $N^{th}$ 3D glue signal by an optical measuring unit, the optical measuring unit being a confocal laser scanning microscopy optical measuring unit, the confocal laser scanning microscopy optical measuring unit being configured to observe layers of the glue, the optical measuring unit using a pinhole of the optical measuring unit to exclude lights within an out-of-focal plane;
obtaining a $N^{th}$ glue dispensing adjustment signal: performing a calculation according to the $N^{th}$ 3D glue signal by a calculating unit to obtain a volume or a weight of the glue at the target position of the $N^{th}$ substrate and comparing the volume or the weight of the glue with a default glue value by the calculating unit, wherein if the volume or the weight of the glue fails to conform to the default glue value, the calculating unit transmits a $N^{th}$ glue dispensing adjustment signal to a glue dispensing control unit; and
dispensing the glue to a $N+1^{th}$ substrate: conveying the $N^{th}$ substrate to leave from the position under the glue dispensing unit and conveying a $N+1^{th}$ substrate to the position under the glue dispensing unit, adjusting the glue supplied by the glue dispensing control unit according to the $N^{th}$ glue dispensing adjustment signal and provided the glue for the glue dispensing unit, and dispensing the glue supplied by the glue dispensing control unit to a target position of the $N+1^{th}$ substrate by the glue dispensing unit and then returning to a step of obtaining the $N^{th}$ 3D glue signal.

\* \* \* \* \*